United States Patent
Han et al.

(10) Patent No.: US 10,499,321 B2
(45) Date of Patent: *Dec. 3, 2019

(54) ENHANCED NODE B, UE AND METHOD FOR SELECTING CELL DISCOVERY SIGNALS IN LTE NETWORKS

(71) Applicant: Intel IP Corporation, Santa Clara, CA (US)

(72) Inventors: Seunghee Han, San Jose, CA (US); Xiaogang Chen, Hillsboro, OR (US); Alexei Davydov, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/824,121

(22) Filed: Nov. 28, 2017

(65) Prior Publication Data

US 2018/0084488 A1    Mar. 22, 2018

Related U.S. Application Data

(63) Continuation of application No. 14/583,281, filed on Dec. 26, 2014, now Pat. No. 9,888,430.

(Continued)

(51) Int. Cl.
*H04W 4/00*       (2018.01)
*H04W 48/16*     (2009.01)
(Continued)

(52) U.S. Cl.
CPC ........... *H04W 48/16* (2013.01); *H04L 5/0048* (2013.01); *H04W 56/00* (2013.01); *H04L 5/1469* (2013.01)

(58) Field of Classification Search
None
See application file for complete search history.

(56) References Cited

U.S. PATENT DOCUMENTS 9,888,430 B2 *   2/2018   Han ................ H04W 48/16
2012/0002740 A1   1/2012   Han et al.
(Continued)

FOREIGN PATENT DOCUMENTS

CA         2938769 C       12/2018
JP      2013529416 A        7/2013
(Continued)

OTHER PUBLICATIONS

"Korean Application Serial No. 10-2016-7022071, Office Action dated Feb. 13, 2018", w/English Translation, 9 pgs.

(Continued)

*Primary Examiner* — Clemence S Han
(74) *Attorney, Agent, or Firm* — Schwegman Lundberg & Woessner, P.A.

(57) ABSTRACT

Embodiments allow selection of a Discovery signal (DS) used to identify an eNB to a UE receiving the DS. The DS allows the UE to ascertain the existence and/or cell identifier of the eNB. DS comprise a plurality of other signals such as a Primary Synchronization Signal (PSS), a Secondary Synchronization Signal (SSS), a Cell Specific Reference Signal (CRS) and/or a Channel State Information Reference Signal (CSI-RS). A DS occasion comprises a number of subframes where the selected signals that comprise the DS are transmitted. The signals selected for the DS, their characteristics and properties allow a UE to decode the cell identifier. The DS occasion occurs with a designated periodicity.

16 Claims, 12 Drawing Sheets

Related U.S. Application Data

(60) Provisional application No. 61/968,278, filed on Mar. 20, 2014, provisional application No. 61/953,639, filed on Mar. 14, 2014.

(51) Int. Cl.
*H04L 5/00* (2006.01)
*H04W 56/00* (2009.01)
*H04L 5/14* (2006.01)

(56) References Cited

U.S. PATENT DOCUMENTS

| | | | |
|---|---|---|---|
| 2012/0122440 | A1 | 5/2012 | Krishnamurthy et al. |
| 2014/0038598 | A1 | 2/2014 | Ren et al. |
| 2014/0171073 | A1 | 6/2014 | Kim et al. |
| 2014/0321370 | A1 | 10/2014 | Chen et al. |
| 2015/0049649 | A1 | 2/2015 | Zhu et al. |
| 2015/0092768 | A1 | 4/2015 | Ng et al. |
| 2015/0189574 | A1 | 7/2015 | Ng et al. |
| 2015/0215799 | A1* | 7/2015 | Kazmi .............. H04W 24/08 370/252 |
| 2015/0223149 | A1* | 8/2015 | Liu .............. H04W 48/12 370/252 |
| 2015/0264638 | A1 | 9/2015 | Han et al. |
| 2015/0365201 | A1 | 12/2015 | Lunttila et al. |
| 2016/0142898 | A1 | 5/2016 | Poitau et al. |
| 2016/0192332 | A1 | 6/2016 | Koorapaty et al. |
| 2016/0360452 | A1* | 12/2016 | Koorapaty .......... H04J 11/0069 |

FOREIGN PATENT DOCUMENTS

| | | |
|---|---|---|
| JP | 6479839 B2 | 2/2019 |
| KR | 1020160108486 A | 9/2016 |
| RU | 2148891 C1 | 5/2000 |
| RU | 2467507 C2 | 11/2012 |
| RU | 2669776 C1 | 10/2018 |
| TW | 201601581 | 1/2016 |
| TW | I552636 B | 10/2016 |
| TW | 201720218 A | 6/2017 |
| TW | I646859 B | 1/2019 |
| WO | WO-2012104630 A1 | 8/2012 |
| WO | WO-2013021188 A1 | 2/2013 |
| WO | WO-2014022806 A2 | 2/2014 |
| WO | WO-2015138418 A1 | 9/2015 |

OTHER PUBLICATIONS

"Japanese Application Serial No. 2016-552913, Examiners Decision of Final Refusal dated Jul. 17, 2018", W/ English Translation, 15 pgs.
"Japanese Application Serial No. 2016-552913, Response filed Feb. 6, 2018 to Office Action dated Aug. 8, 2017", W/ English Claims, 10 pgs.
"Japanese Application Serial No. 2016-552913, Response filed Nov. 16, 2018 to Examiners Decision of Final Refusal dated Jul. 17, 2018", W/ English Claims, 14 pgs.
"Korean Application Serial No. 10-2016-7022071, Final Office Action dated Jun. 21, 2018", w/ English Translation, 6 pgs.
"Korean Application Serial No. 10-2016-7022071, Reconsidered Final Office Action dated Aug. 20, 2018", W/ English Translation, 9 pgs.
"Korean Application Serial No. 10-2016-7022071, Response filed Apr. 12, 2018 to Office Action dated Feb. 13, 2018", (W/ English Claims), 15 pgs.
"Korean Application Serial No. 10-2016-7022071, Response filed Jul. 20, 2018 to Final Office dated Jun. 21, 2018", W/ English Claims, 19 pgs.
"Korean Application Serial No. 10-2016-7022071, Response filed Oct. 22, 2018 to Reconsidered Final Office Action dated Aug. 20, 2018", W/ English Claims, 9 pgs.

"Mexican Application Serial No. MX/a/2016/010562, Office Action dated May 3, 2018", w/o English translation, 3 pgs.
"Mexican Application Serial No. MX/a/2016/010562, Response filed Aug. 3, 2018 to Office Action dated May 3, 2018", W/ English Claims, 12 pgs.
"Russian Application Serial No. 2017138393, Office Action dated May 7, 2018", w Partial English Translation, 7 pgs.
"Russian Application Serial No. 2017138393, Response filed Aug. 2, 2018 to Office Action dated May 7, 2018", W/ English Claims, 7 pgs.
"Taiwanese Application Serial No. 105124143, Office Action dated Apr. 18, 2018", w/ English Translation, 17 pgs.
"Taiwanese Application Serial No. 105124143, Response filed Jul. 9, 2018 to Office Action dated Apr. 18, 2018", W/ English Claims, 11 pgs.
Ericsson, "On Small cell on/off and the New L1 procedure", R1-140758, 3GPP TSG RAN WG1 Meeting #76, Czech Republic, [Online] Retrieved From the Internet: <URL:http://www.3gpp.org/ftp/tsg_ran/WG1_RL1/TSGR1_76/Docs/R1-140758,zip>, (Feb. 2014), 5 pgs.
Huawei, Hisilicoon, "Discovery design options", R1-140039, 3GPP TSG RAN WG1 Meeting #76, Czech Republic, [online] Retrieved from the Internet: (Feb. 2014) <URL:<http://www.3gpp.org/ftp/tsg_ran/wg1_rl1/TSGR1_76/Docs/R1-140039.zip>, 7 pgs.
"European Application Serial No. 15760974.4, Extended European Search Report dated Sep. 29, 2017", 10 pgs.
"U.S. Appl. No. 14/583,281, Final Office Action dated Jul. 14, 2017", 9 pgs.
"U.S. Appl. No. 14/583,281, Non Final Office Action dated Feb. 10, 2017", 11 pgs.
"U.S. Appl. No. 14/583,281, Notice of Allowance dated Sep. 27, 2017", 7 pgs.
"U.S. Appl. No. 14/583,281, Preliminary Amendment filed Jan. 25, 2017", 6 pgs.
"U.S. Appl. No. 14/583,281, Response filed May 10, 2017 to Non Final Office Action dated Feb. 10, 2017", 9 pgs.
"U.S. Appl. No. 14/583,281, Response filed Sep. 7, 2017 to Final Office Action dated Jul. 14, 2017", 7 pgs.
"Australian Applicatoin Serial No. 2015229638, First Examiners Report dated Mar. 16, 2017", 2 pgs.
"Canadian Application Serial No. 2,938,769, Office Action dated May 25, 2017", 3 pgs.
"Canadian Application Serial No. 2,938,769, Response Filed Nov. 7, 2017 to Office Action dated May 25, 2017", 13 pgs.
"Cell search and cell selection in UMTS LTE", Rohde & Schwarz 1MA150_0E, (2009), 40 pgs.
"European Patent Application No. 15760974.4, Response Filed May 2, 2017 to Communication Pursuant to Rules 161(2) and 162 EPC dated Oct. 21, 2016", (W/ Claims), 12 pgs.
"Indian Application Serial No. 201647026753, Voluntary Amendment filed on May 5, 2017", 12 pgs.
"International Application Serial No. PCT/US2015/019655, International Preliminary Report on Patentability dated Sep. 22, 2016", 11 pgs.
"International Application Serial No. PCT/US2015/019655, International Search Report dated May 28, 2015", 3 pgs.
"International Application Serial No. PCT/US2015/019655, Written Opinion dated May 28, 2015", 9 pgs.
"Japanese Application Serial No. 2016-552913, Office Action dated Aug. 8, 2017", 10 pgs.
"Learning LTE", Articles, updates on LTE from 3GPP standard specifications, (Apr. 12, 2012), 3 pgs.
"Let's Learn LTE", LTE Achitechture and Protocol Details., (Jan. 16, 2012), 4 pgs.
"Mexican Application Serial No. MX/a/2016/010562, Voluntary Amendment filed on Mar. 24, 2017", (W/O English Claims), 9 pgs.
"Performance comparison of small cell discovery signal designs", Mediatek Inc., R1140831, 3GPP TSG RAN WG1 Meeting #76, Czech Republic, (Feb. 10-14, 2014), 7 pgs.
"Russian Application Serial No. 2016133291, Office Action dated Mar. 28, 2017", (W/ English Translation), 5 pgs.

(56) References Cited

OTHER PUBLICATIONS

"Russian Application Serial No. 2016133291, Response Filed Jun. 16, 2017 to Office Action dated Mar. 28, 2017", (W/ English Claims), 15 pgs.

"Taiwanese Application Serial No. 104107923, Office Action dated Feb. 23, 2016", W/ English Translation, 19 pgs.

"Taiwanese Application Serial No. 104107923, Response filed May 12, 2016 to Office Action dated Feb. 23, 2016", W/ English Translation of Claims, 21 pgs.

"Taiwanese Application Serial No. 105124143, Office Action dated May 23, 2017", w/English Translation, 19 pgs.

"Taiwanese Application Serial No. 105124143, Response Filed Aug. 23, 2017 to Office Action dated May 23, 2017", (W/ English Claims), 18 pgs.

"Views on discovery signal design for Rel-12 small cell enhancement", NTT DOCOMO, R1140622, 3GPP TSG RAN WG1 Meeting #76, Czech Republic (Feb. 10-14, 2014), 7 pgs.

Ericsson, "On the design of discovery bursts and procedures", R1-140759, 3GPP TSG RAN WG1 Meeting #76, Czech Republic, [Online] Retrieved From the Internet: <URL:http://www.3gpp.org/ftp/tsg_ran/WG1_RL1/TSGR1_76/Docs/R1-140759.zip>, (Feb. 1, 2014), 7 pgs.

ETRI, "Discovery signal design for small cell art/off", R1-140213, 3GPP TSG RAN WG1 Meeting #76, Czech Republic, (Feb. 10-14, 2014), 4 pgs.

NEC, "Small cell discovery signal design", R1-140487, 3GPP TSG RAN WG1 Meeting #76, Czech Republic, [Online] Retrieved from the internet: <URL:http://www.3gpp.org/ftp/tsg_ran/WG1_RL1/TSGR1_76/Docs/R1-140487.zip>, (Jan. 31, 2014,), 1-4.

Samsung, "Discovery Signal Requirements for Small Cells", 3GPP TSG-RAN WG1#76 R1-140369, [Online] retrieved from the internet: <URL:http://www.3gpp.org/ftp/tsg_ran/WG1_RL1/TSGR1_76/Docs/R1-140369.zip>, (Feb. 1, 2014).

Tsai, Yingming, et al., "Cell Search in 3GPP Long Tenn Evolution Systems", IEEE Vehicular Technology Magazinw, (Jun. 2007), 23-29.

"European Application Serial No. 15760974.4, Communication Pursuant to Article 94(3) EPC dated May 28, 2019", 6 pgs.

"European Application Serial No. 15760974.4, Communication Pursuant Article 94(3) EPC dated Oct. 11, 2018", 8 pgs.

"European Application Serial No. 15760974.4, Response Filed Feb. 12, 2019 to Communication Pursuant to Article 94(3) EPC dated Oct. 11, 2018", 9 pgs.

"Korean Application Serial No. 10-2016-7022071, Notice of Preliminary Rejection dated Feb. 23, 2019", w/ English translation, 9 pgs.

"Korean Application Serial No. 10-2016-7022071, Response filed Apr. 23, 2019 to Notice of Preliminary Rejection dated Feb. 23, 2019", w/ English Claims, 18 pgs.

NTT DOCOMO, "Text proposal of TR 36.872 on efficient discovery of small cells", 3rd Generation Partnership Project (3GPP), Mobile Competence Centre; 650, Route Des Lucioles; F-06921 Sophia-Antipolis Cedex; France, vol. RAN Wg1, No. Barcelona, Spain, (Aug. 23, 2013), 9 pgs.

Samsung, "Detailed design of discovery signal", R1-143067 3GPP TSG-RAN WG1#78 Dresden, Germany, (Aug. 10, 2014), 6 pgs.

ZTE, "Companion Discovery Signal (CDS)—Operation for Small cell ON", 3gpp Draft; R1-140287 Companion Discovery Signal (CDS)—Operation for Small Cell on Off, 3rd Generation Partnership Project (3GPP), Mobile Competence Centre; 650, Route Des Lucioles, (Jan. 31, 2014), 4 pgs.

\* cited by examiner

ENHANCED NODE B, UE AND METHOD FOR SELECTING CELL DISCOVERY SIGNALS IN LTE NETWORKS

CROSS-REFERENCE TO RELATED APPLICATION

This application is a continuation of U.S. patent application Ser. No. 14/583,281, filed Dec. 26, 2014, which application claims priority to U.S. Provisional Patent Application Ser. No. 61/968,278, filed Mar. 20, 2014, entitled "Small Cell Discovery Signal," and to U.S. Provisional Patent Application Ser. No. 61/953,639, filed Mar. 14, 2014, entitled "Small Cell Discovery Signal", both of which are incorporated herein by reference in their entireties.

TECHNICAL FIELD

Embodiments pertain wireless communications and more specifically to discovery signals used by enhanced Node B (eNB) devices to help User Equipment (UE) ascertain the identity of an eNB. Some embodiments relate to cellular networks, including networks operating in accordance with one or more of the 3GPP LTE standards.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations such as enhanced Node Bs (eNBs) that can support communication for a number of user equipments (UEs). A UE may communicate with an eNB via the downlink and uplink. The downlink (or forward link) refers to the communication link from the eNB to the UE, and the uplink (or reverse link) refers to the communication link from the UE to the eNB.

As part of the procedure to establish a connection between an eNB and UE, the UE may ascertain the identity of a particular eNB.

DETAILED DESCRIPTION

Figure 1:
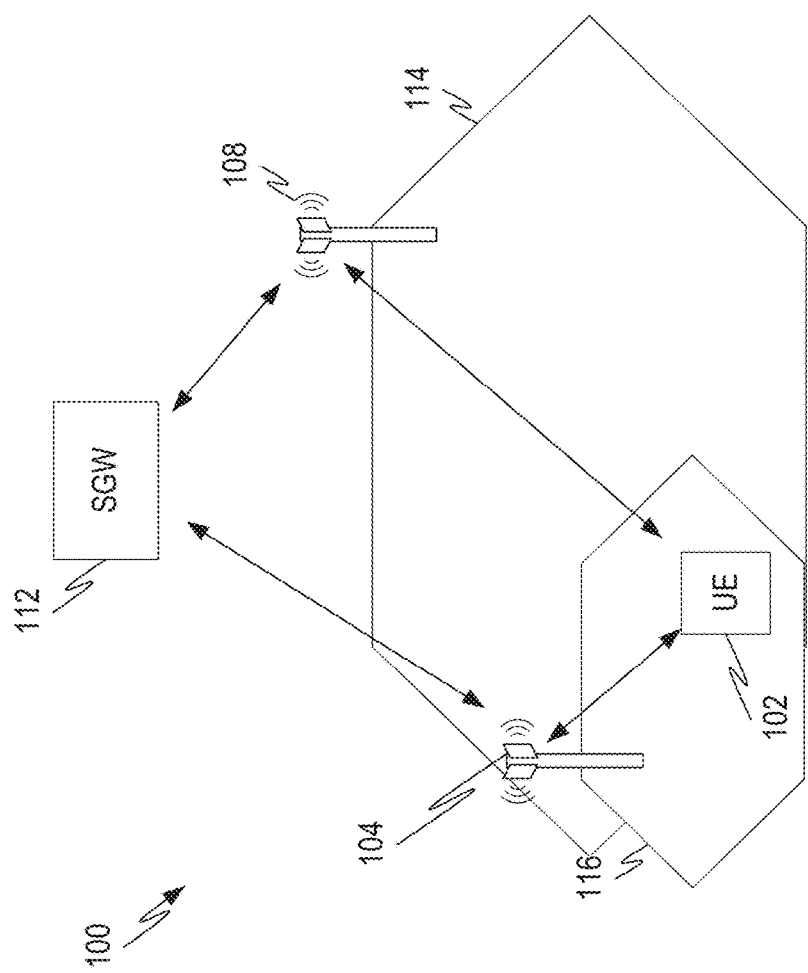
FIG. 1 illustrates a representative signal of a representative wireless network in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Part of the procedures used to establish communication between an eNB and a UE in wireless networks may include the eNB transmitting a discovery signal and the UE using the discovery signal to ascertain the identity of a particular UE. When a UE is covered and/or served by multiple eNBs, such as when a UE is served by both a macro cell eNB and a small cell eNB, discovery of the small cell eNB may be enhanced through the use of a discovery signal. Embodiments disclosed herein illustrate example discovery signals (DSs) and representative eNB and UE implementations to create, transmit and receive such DS. The DS are unique from any other discovery signals that may be in current use.

A discovery signal (DS) is sent during a DS occasion, comprising one or more subframes. The subframes can be both Downlink (DL) and Uplink (UL) subframes in TDD. For instance, in some embodiments, the DS occasion comprises a sequence of N consecutive subframes. Such a sequence of N consecutive subframes can comprise, for example, the summation of DL and UL subframes (the total equal to N) in TDD. For FDD, N consecutive subframes can correspond to N DL subframes. The DS occasion occurs periodically with a specified period. During a DS occasion, an eNB selects the composition of the DS, and the subframes within the DS occasion that will be used to transmit the signals that make up the DS. A UE will note the occurrence of a DS occasion, receive the various signals that make up the DS and decode the eNB identity from the DS. The selected subframes can be selected to minimize interference with other competing eNBs in some embodiments.

The various DSs disclosed herein make use of a combination of the Primary Synchronization Signal (PSS), the Secondary Synchronization Signal (SSS), Cell Specific Reference (CRS), and/or a Channel State Information Reference Signal (CSI-RS) (if CSI-RS is configured for DS based measurement). In one example embodiment the DS comprises the PSS, the SSS, and the CRS. In another example, the DS comprises the PSS, the SSS, the CRS and the CSI-RS. In other embodiments, other combinations could be used.

FIG. 1 illustrates a representative signal of a representative wireless network in accordance with some embodiments. The figure can illustrate either single connectivity, where a UE 102 is served by a single eNB (e.g., 108 or 104), or carrier aggregation or dual connectivity, where a UE is served by multiple carriers/eNBs, such as a primary carrier or eNB 108 and a secondary carrier or eNB 104. A primary eNB can also be referred to as a master eNB, a macro eNB or other names, most of which imply that the cell coverage 114 served by the primary eNB 108 is larger than the cell coverage 116 served by the secondary eNB 104. The secondary eNB 104 can also be referred to as a small cell eNB, a pico cell eNB or other such names.

In some, although not all, embodiments of FIG. 1, the coverage area 114 of the primary eNB 108 is larger than the secondary eNB 104 coverage area 116. Both primary eNB 108 and secondary eNB 104 are served by core network elements, represented, for example, by serving gateway 112.

To help UE 102 establish a connection to eNB 108 and/or eNB 104, the eNB 104 and/or the eNB 108 can transmit one or more types of DSs to the UE. One purpose of the DS can be to identify the transmitting cells/eNB. The DS may be of a common format between the eNB (e.g., eNB 108 and eNB 104) or may be of different formats, depending on the embodiment.

Figure 2:
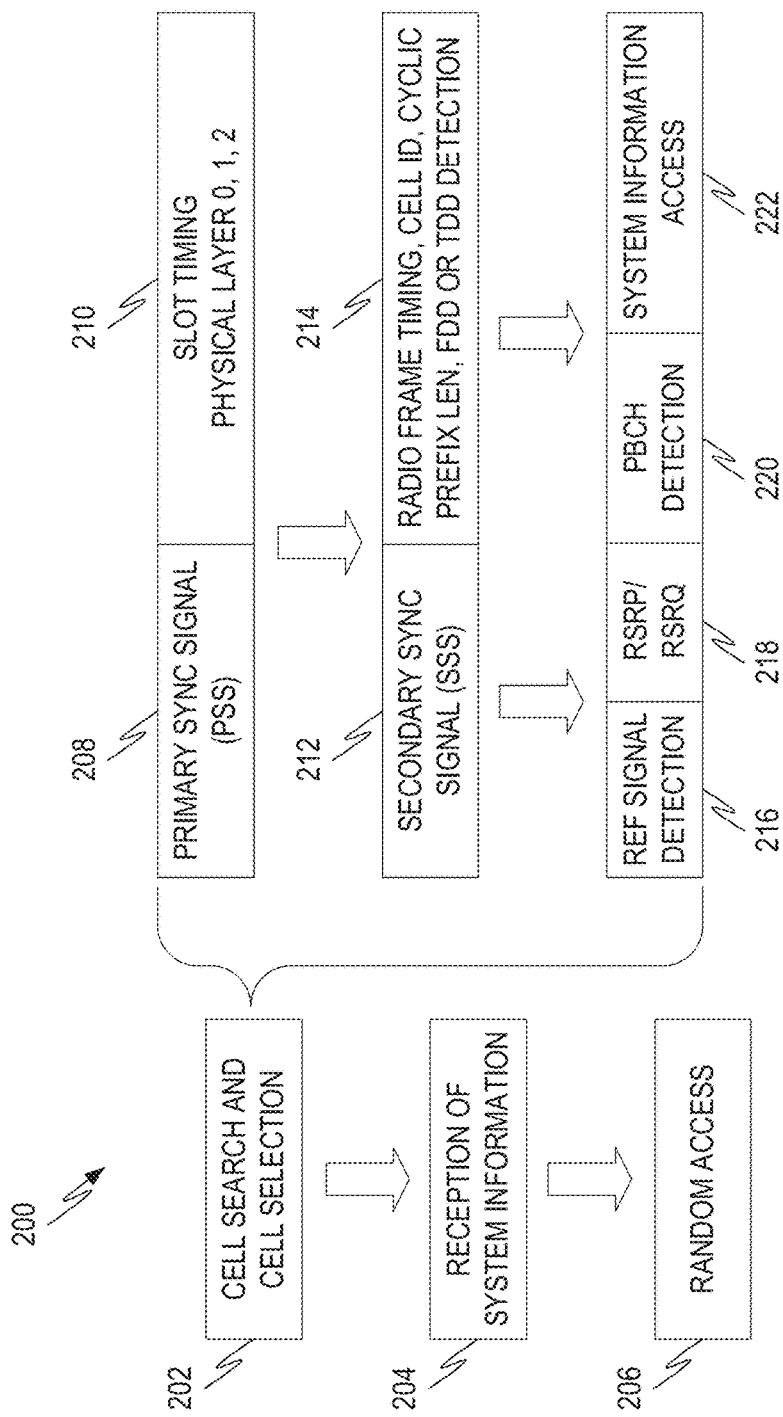
FIG. 2 illustrates representative operations for UE to establish communication with an eNB in accordance with some embodiments.

FIG. 2 illustrates representative operations for UE to establish communication with an eNB. The operations performed by the UE, illustrated generally as 200, include cell search and cell selection 202, reception of system information 204 and random access 206.

Successful completion of cell search and selection 202 as well as acquiring initial information is completed before the UE can communicate with the network. Current LTE networks use a hierarchical cell-search procedure in which an LTE cell (i.e., the eNB which serves the cell area) is identified by a cell identity that is one of 504 unique identifiers that run from 0 to 503. The identifiers are divided into 168 unique cell layer identity groups (running from 0 to 167), with three physical layer identities (0-2) in each group. However, with the DSs disclosed below, cell identities can be assigned differently since different signals and different rules apply to the disclosed DSs.

For existing discovery signals (consisting of PSS and SSS), the PSS allows the slot timing to be detected by the UE and the code used in the PSS identifies the physical layer identity (0, 1, 2), as identified in FIG. 1 operations 208 and 210. The SSS then allows radio frame timing detection, allows the UE to find the physical layer Cell ID (0-167), allows cyclic prefix length detection and allows the UE to perform FDD or TDD detection (operations 212 and 214). Thus, for these discovery signals, the cell ID is given by the equation:

Primary Cell ID=Cell Group ID*3+Cell ID

Where: the cell group ID is the physical layer cell ID (0-167) and the Cell ID is the physical layer identity (0-2)

Once the primary and secondary synchronization has occurred, the final step is to detect any reference signals (operation 216), perform downlink channel estimation (operation 218) such as Reference Signal Received Power (RSRP) and Reference Signal Received Quality (RSRQ), Detect the Physical Broadcast Channel (PBCH) (operation 220), and access system information (operation 222).

As indicated in operations 204 and 206, the UE can then receive system information and begin transmitting information using the cell.

Figure 3:
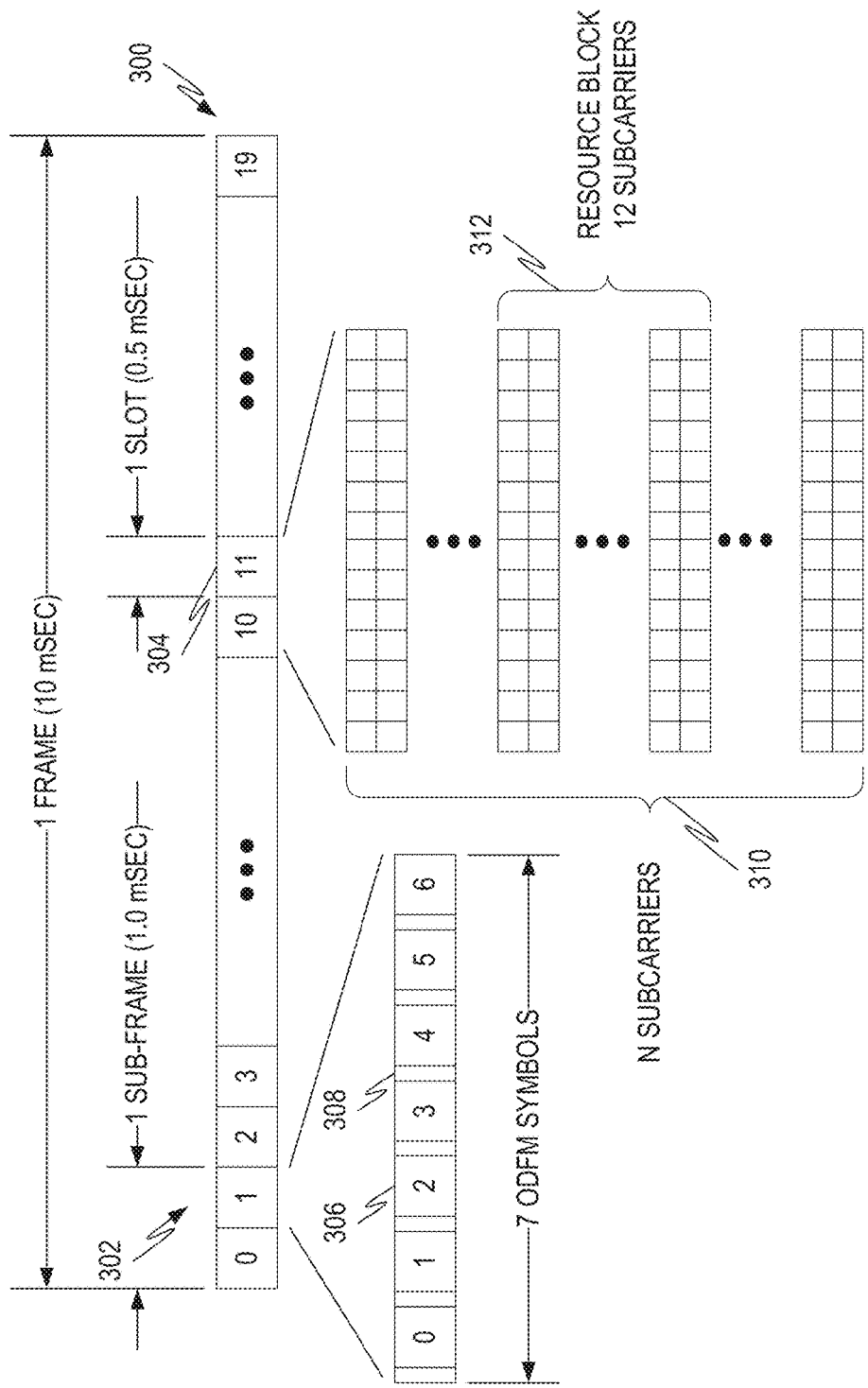
FIG. 3 illustrates a representative frame structure in accordance with some embodiments.

FIG. 3 illustrates a representative frame structure in accordance with some embodiments. The frame structure is representative, for example of an LTE Type 1 frame structure. The Type 1 frame structure is used for an LTE FDD mode system. Each frame 300 is 10 ms. long and has 10 subframes 302 that are 1 ms. long. Each subframe has two slots 304, each 0.5 ms. in length. Each slot has seven ODFM symbols 306, each with a cyclic prefix 308.

The total number of subcarriers in each slot depends on the bandwidth and is represented in FIG. 3 by N 310. A resource block 312 comprises 12 subcarriers.

Figure 4:
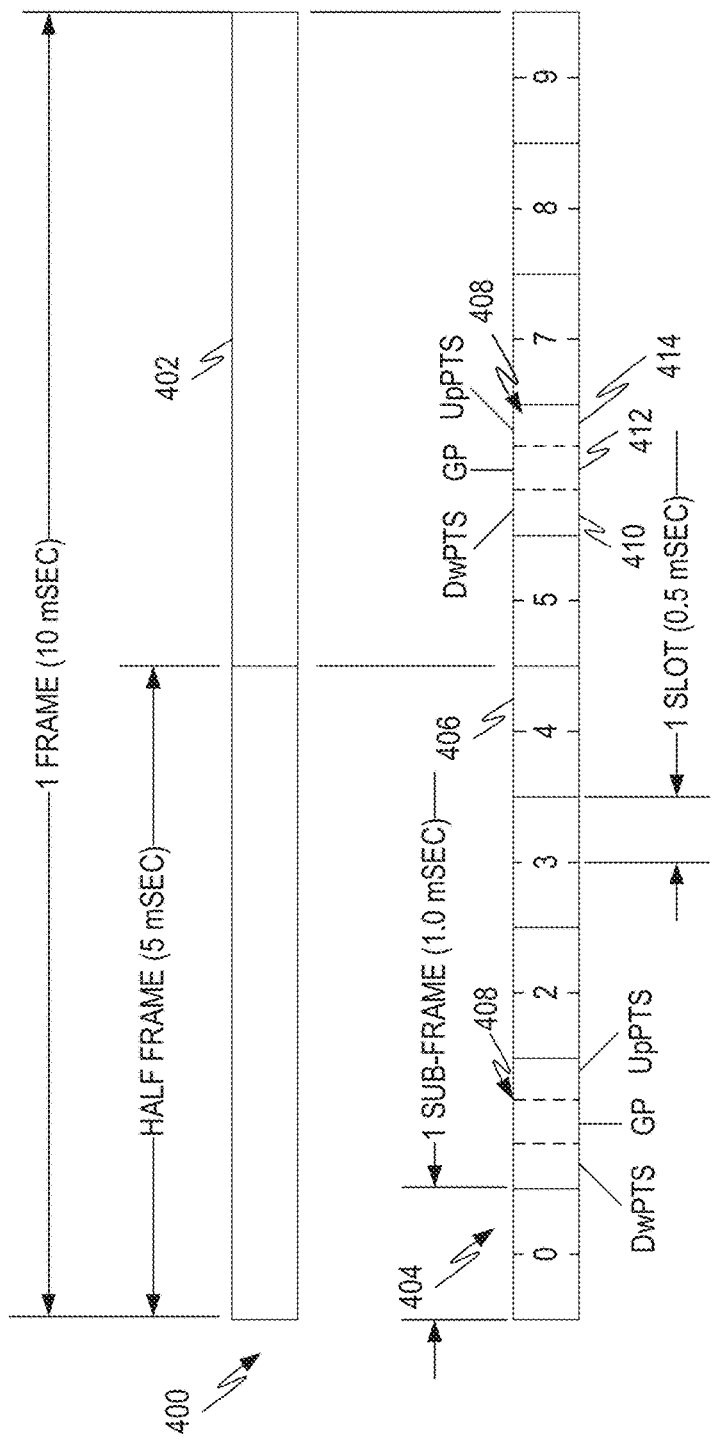
FIG. 4 illustrates another representative frame structure in accordance with some embodiments.

FIG. 4 illustrates another representative frame structure in accordance with some embodiments. The frame structure is representative, for example of an LTE Type 2 frame structure. The Type 2 frame structure is used for an LTE TDD mode system. The frame 400 in a Type 2 frame structure is 10 ms. long and consists of two half-frames 402, each 5 ms. in length. Each half-frame 402 had five subframes 404 each 1 ms. in length. Each subframe has two slots 406, 0.5 ms. in length.

While the LTE frequency division duplexing (FDD) system has 10 contiguous downlink subframes and 10 contiguous uplink subframes in each frame, the LTE time-division duplexing (TDD) system has multiple downlink-uplink allocations, whose downlink and uplink subframe assignments are given in Table 1, where the letters D, U and S represent the corresponding subframes and refer respectively to the downlink subframe, uplink subframe and special subframe that contains the downlink transmission in the first part of a subframe and the uplink transmission in the last part of subframe.

The two special subframes 408 contain a Downlink Pilot Time Slot 410 (DwPTS), a Guard Period 412 (GP), and an Uplink Pilot Time Slot 414 (UpTS). These three fields are individually configurable in terms of length, although the total length of all three is 1 ms. For a Type 2 frame structure, the subframes are allocated to uplink, downlink or special according to Table 1 below.

TABLE 1

TDD Allocation Configurations

| Uplink-downlink configuration | Downlink to uplink switch point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 1-continued

TDD Allocation Configurations

| Uplink-downlink config-uration | Downlink to uplink switch point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | D | D |

Figure 5:
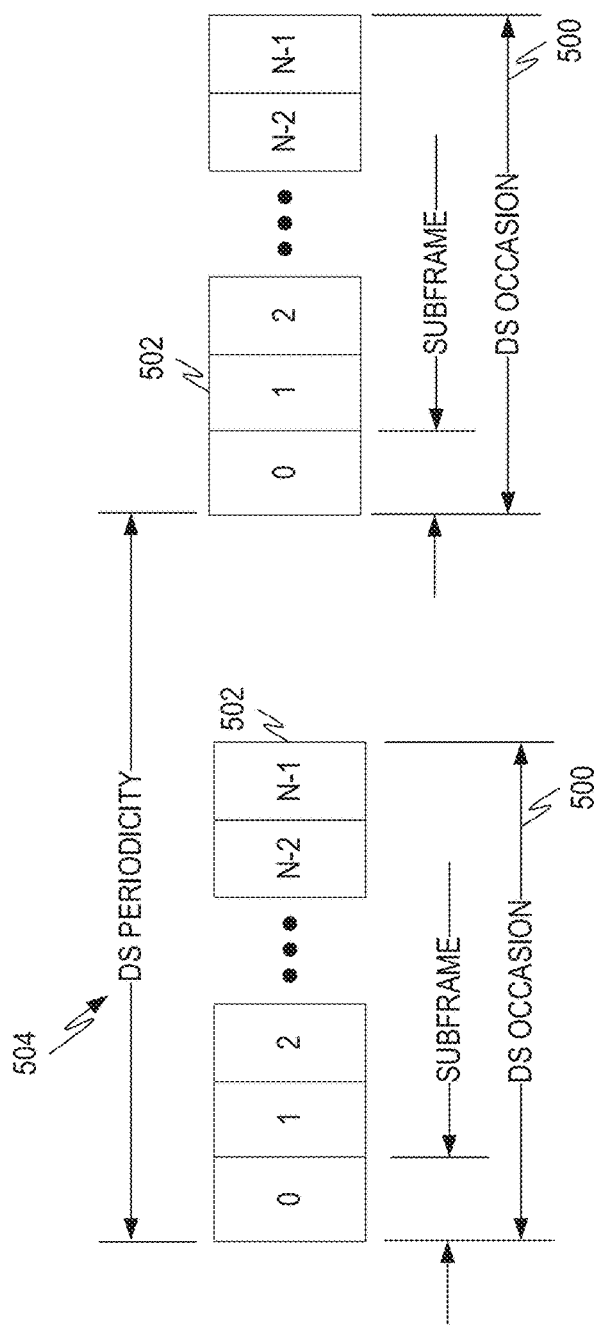
FIG. 5 illustrates a representative discovery signal (DS) occasion with its associated subframes and periodicity in accordance with some embodiments.

The DSs in this disclosure are transmitted periodically to allow UE to identify the cell. FIG. 5 illustrates a representative DS occasion with its associated subframes and periodicity in accordance with some embodiments. A DS occasion 500 comprises a number of consecutive subframes 502. In FIG. 5 this number is represented by N, with the subframes 502 running from 0 to N−1, although a different numbering scheme could be used. The subframes 502 are subframes such as those discussed in FIGS. 3 and 4 above. The total number of subframes 502 in the DS occasion 500 depends on the subframe structure type (i.e., Type 1 or Type 2) in some embodiments. In some embodiments, for Type 1 the DS occasion 500 has from one to five subframes 502. In some embodiments, for Type 2 the DS occasion 500 has from two to five subframes 502. In these embodiments, the subframes 502 are consecutive. The meaning of consecutive can be tied to the subframe structure type (Type 1 or Type 2) in some embodiments. In these embodiments, the N consecutive subframes can comprise, for example, the summation of DL and UL subframes (the total equal to N) for a Type 2 subframe structure (TDD structure). For a Type 1 subframe structure (FDD structure), N consecutive subframes can correspond to N DL subframes. In other embodiments, a different number of subframes 502 are used. In embodiments where the subframes 502 are variable (one to five, two to five, for example), configuration of the number of subframes 502 can come from a layer higher than the physical layer of the receiver, such as the Radio Resource Control (RRC) layer or some other layer.

The DS occasion 500 has a period 504. The period 504 in some embodiments is 40 ms., 80 ms., or 160 ms. In some embodiments, this period 504 is selectable, in other embodiments the period 504 depends on different parameters or is configured by a higher layer, as for example the RRC layer.

In some embodiments, during the DS occasion 500, the UE is able to assume that there are no other signals present except for the DS signals.

Figure 6:
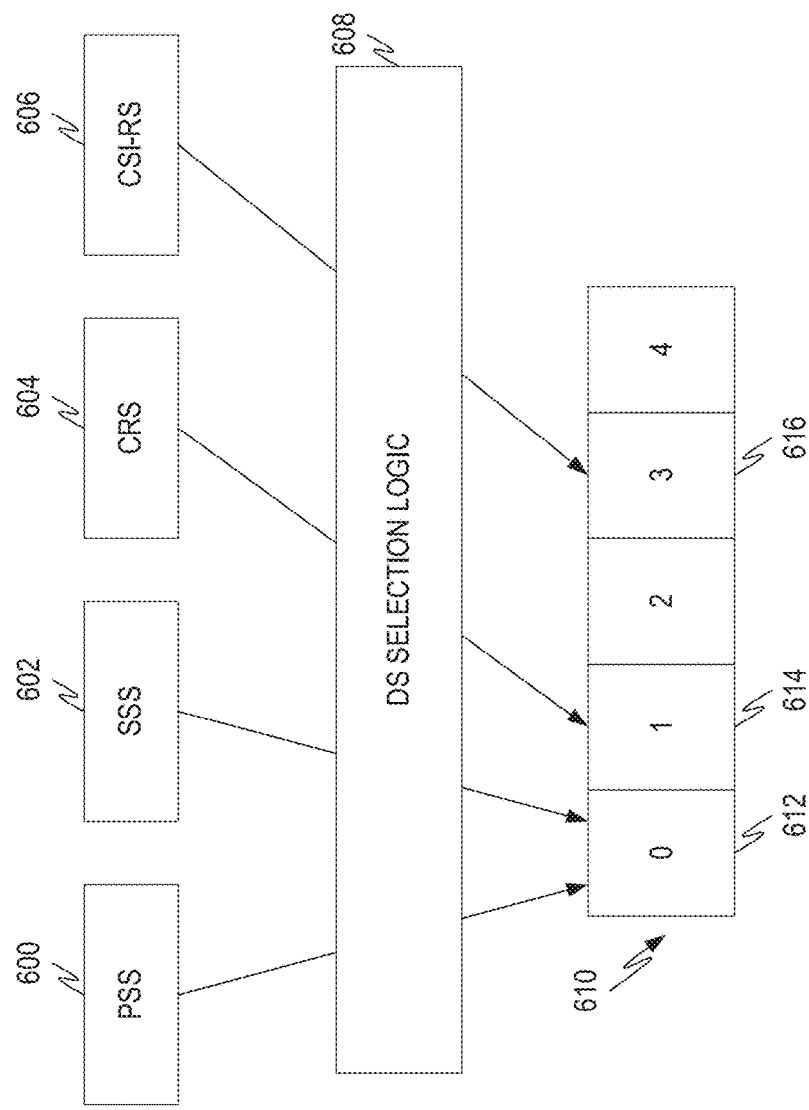
FIG. 6 illustrates a conceptual framework for selecting components of a representative DS in accordance with some embodiments.

FIG. 6 illustrates a conceptual framework for selecting components of a representative DS in accordance with some embodiments. Unlike existing discovery signals, the DSs of this disclosure include not only PSS 600 and SSS 602, but also at least one of a Cell Specific Reference Signal 604 (CRS) and a Channel State Information Reference Signal 606 (CSI-RS). Thus, a DS can contain PSS 600 and SSS 602 and CRS 604, PSS 600 and SSS 602 and CSI-RS 606, PSS 600 and SSS 602 and CRS 604 and CSI-RS 606, as well as other possible combinations such as PSS 600 and CSI-RS 606 or PSS 600 and SSS 602, but in a different configuration that currently used. Thus, different embodiments use a DS comprising one or more of the reference signals PSS 600, SSS 602, CRS 604 and/or CSI-RS 606. Other signals could also be used.

Embodiments of the present disclosure comprise DS selection logic 608 to select which signals (600, 602, 604, 606) are to be used for the DS and which subframes of a DS occasion are used to transmit the different signals that make up the DS. In addition, where a signal (600, 602, 604, 606) can be transmitted in a different time and/or frequency slot within a subframe or can be configured using a different signal characteristics, such as a code for the PSS and or SSS signal, the DS selection logic can make those selections as well in some embodiments. In FIG. 6, a DS occasion is illustrated generally as 610 and, in the illustrated embodiment, comprises five subframes, some of which are identified as 612, 614, and 616. The DS selection logic 608 selects the specific signals that will be transmitted as part of the DS in the DS occasion, and maps the individual signals to an appropriate subframe. For example, PSS 600 and SSS 602 are mapped to subframe 612, CRS 604 is mapped to subframe 614 and CSI-RS is mapped to subframe 616. However, this is simply a representative example.

The various signals can be transmitted in a "balanced" or "unbalanced" scheme. In other words, some embodiments use a balanced scheme, some embodiments use an unbalanced scheme and some use both.

In an unbalanced transmission, different components of the DS are transmitted in different subframes. Thus, the representative example of FIG. 6 is an unbalanced transmission as the PSS 600 and the SSS 602 signals are transmitted in subframe 612, while the CRS 604 signal is transmitted in subframe 614 and the CSI-RS 606 signal is transmitted in subframe 616.

Other examples of unbalanced schemes can be performed between signal A and signal B, where signal A and B are transmitted in different subframes. In one example, signal A comprises PSS and/or SSS while signal B comprises CRS and/or CSI-RS. In another example, signal A comprises PSS, SSS and/or CRS while signal B comprises nothing.

In a balanced scheme, the signals are all transmitted in the same subframe, and in some embodiments, repeated in one or more subsequent subframes.

The DS selection logic 608 may be configured in a number of ways that can vary from embodiment to embodiment. In one example embodiment, the eNB itself configures the DS selection logic, for example using the RRC processing. In other embodiments, the eNB may receive information from other sources, such as the core network, that is used in either directing the DS selection logic configuration or helping identify portions of the DS selection logic configuration.

As an example, the PSS and/or SSS are transmitted in at least one subframe to avoid interference from different cells. The selection logic can utilize different rules such as:
1. The transmitted location of time and/or frequency domain for PSS and/or SSS can be pre-determined according to cell ID or virtual cell ID;
2. The transmitted location of time and/or frequency domain for PSS and/or SSS can be configured by higher level signaling, such as RRC;
3. The transmitted location of time and/or frequency domain for CRS and/or CSI-RS can be pre-determined according to cell ID or virtual cell ID; and
4. The transmitted location of time and/or frequency domain for CRS and/or CSI-RS can be configured by higher level signaling, such as RRC.

Other rules can be added to and/or substituted in the DS selection logic. In one embodiment, the DS selection logic comprises the following rules:

1. The CRS is transmitted on antenna port 0 in all downlink subframes and in DwPTS of all special subframes in the DS occasion;
2. The PSS is transmitted in the first subframe of the DS occasion for frame structure type 1 or the second subframe of the DS occasion for frame structure type 2;
3. The SSS is transmitted in the first subframe of the DS occasion; and
4. A non-zero-power CSI-RS is transmitted in zero or more subframes in the DS occasion.

In other embodiments, different DS selection logic rules are used. Furthermore, the rules used by any embodiment can further specify characteristics of the signals used for the DS, including a sequence or code used to transmit the signal, location within a subframe such as which slot is used to transmit the signal, the subcarrier used to transmit the signal (for those signals that use one or more subcarriers), or other signal characteristics. These characteristics and selection rules can be pre-defined according to cell ID (physical or virtual), configured by a higher level signaling such as RRC, and/or both.

Varying these characteristics can convey information to the UE to allow the UE to decode the cell ID of the transmitting eNB. Thus, the DS selection logic also relies on the rules to encode an appropriate identifier into the DS, such as by varying the signals transmitted and the characteristics of the signals transmitted in order to allow the UE to decode the cell ID. This cell ID may be a physical cell ID or a virtual cell ID. The cell ID may also be referred to as an eNB identifier or another term. The intent of the DS is that the UE can also ascertain the identity of the eNB (and hence, the cell) that is transmitting the DS.

Encoding/decoding the cell ID from the combination of signals that make up the DS can be done in a variety of ways and this disclosure is not specific as to how the signals encode/decode the cell ID. However, the following describes the options available that can be used to create a specific mapping from a desired cell ID to various combinations of signal parameters. Note that variation in some or all of these parameters can be used to convey meaning to the UE in order for the UE to decode the cell ID from the transmitted/received signals.

Both primary and secondary synchronization signals are designed to be detected by all type of UEs. The synchronization signals occupy 62 sub-carriers of the channel, which makes the cell search procedure the same regardless of channel bandwidth. The primary synchronization signal subcarriers are modulated using a frequency domain Zadoff-Chu Sequence. Each subcarrier has the same power level with its phase determined by the root index number in sequence generator as defined in 3GPP TS 36.211.

The coding of the Zadoff-Chu Sequence is changed in some embodiments in order to convey information. Thus, which variation of the Zadoff-Chu sequence is received can be used to convey information to the UE and act as part of the information used to encode/decode the cell ID. Although current specifications require the PSS to be transmitted in the same symbol of the same slot, with the DS in this disclosure, the symbol can be changed in some embodiments to also specify part of the information used to encode/decode the cell ID.

The secondary signal code uses an interleaved concatenation of two length 31 binary sequences as defined in 3GPP TS 36.211. Like the PSS, the code used for the SSS can convey information to the UE and act as part of the information used to encode/decode the cell ID. Also like the PSS, the slot used for the transmission of the SSS can be used to convey information to the UE.

The CRS is transmitted in one or more physical antenna ports. In general, it is used for both demodulation and measurement purpose and its pattern design ensures channel estimation accuracy. When used as part of the DS, the CRS can convey information to the UE based on which subframe, slot, subcarrier, and so forth it is transmitted on. Furthermore, the antenna port used for the CRS when transmitted as part of the DS can also vary, although as shown above, some embodiments fix the antenna port.

In general, a cell can be configured with one, two, four or eight CSI-RS (transmitted on one, two, four or eight antenna ports, respectively). The exact CSI-RS structure, including the exact set of resource elements used for CSI-RS in a resource block, depends on the number of CSI-RS configured within the cell and may also be different for different cells. More specifically, within a resource-block pair there are 40 possible positions for the reference symbols of CSI-RS and, in a given cell, a subset of corresponding resource elements is used for CSI-RS transmission.

When used as part of the DS, the characteristics of the CSI-RS can be varied to convey information to the UE. Thus, the number of CSI-RS used, the set of resource elements used, and so forth can be varied to encode information to the UE.

Thus the combination of which signals comprise the DS and the characteristics of the signals can be used to convey information to a UE to allow the UE to decode the cell ID of the transmitting eNB. Furthermore, a cell may be active or deactivated for a particular UE. When a cell is deactivated, such as a deactivated secondary sell, the UE may make certain assumptions when receiving the DS. In one embodiment, except for discovery-signal transmissions, the UE need not assume transmission of PSS, SSS, Physical Broadcast Channel (PBCH), CRS, Physical Control Format Indicator Channel (PCFICH), and CSI-RS from that secondary cell until the subframe where an activation command is received.

Figure 7:
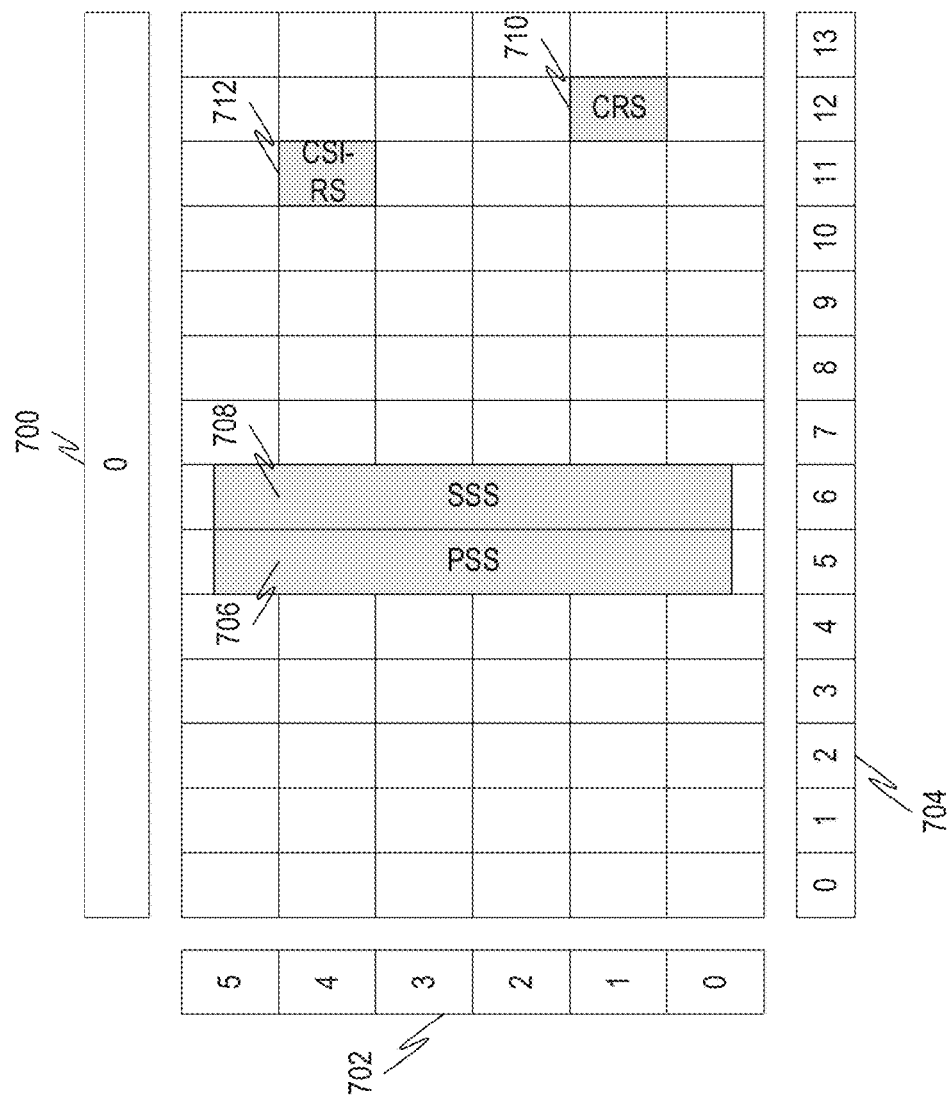
FIG. 7 illustrates an example of a representative DS, in accordance with some embodiments.

FIG. 7 illustrates an example of a representative DS, in accordance with some embodiments. This FIG can illustrate, for example, where FDD is used (i.e., Type 1 frame structure). In this example, the DS consists of a single subframe 700 and the transmission is balanced in that all selected signals are transmitted in the subframe 700. The subframe 700 is illustrated as having six resource blocks 702, each having 12 subcarriers (not shown). The subframe 700 has 14 ODFM symbols 704. The selected DS comprises the PSS 706, the SSS 708, the CRS 710 and the CSI-RS 712. This illustration has been selected to illustrate that all four of the potential signals that make up the DS can be transmitted in a single subframe for frame type 1. Of course, the DS may contain fewer than all the signals, such as PSS 706, SSS 708 and CRS 710 or any other combination in other embodiments.

The total number of subcarriers in the slot is 72 (6*12) and, as indicated above, the PSS 706 and SSS 708 are transmitted using 62 subcarriers and each are encoded using a code, such as the codes specified in TS 36.211. Thus, PSS 706 and SSS 708 are shown as taking the substantial part of the 72 subcarriers of bandwidth. In the illustrated embodiment, the PSS 706 is transmitted in symbol 5 and the SSS 708 transmitted in symbol 6. This is different than the reference signals of current systems which have the order reversed (SSS 708 in symbol 5 and PSS 706 in symbol 6). Switching the order will help legacy UE from being confused as to the role of PSS 706 and SSS 708 in this new DS.

In fact, using the identified locations, a DS could be constructed using only PSS 706 and SSS 708 in a way that would not impact legacy UE.

As discussed above, the CRS 710 is transmitted on a particular antenna port and in a particular resource block. The CRS 710 may not take all subcarriers in the resource block, but for simplicity in illustration, FIG. 7 illustrates that the CRS 710 is transmitted within a particular resource block. As previously discussed, the CRS 710 can convey information to the UE based on which subframe, slot, subcarrier(s), port(s), and so forth it is transmitted on. In the representative example of FIG. 7, the CRS 710 is transmitted on antenna port 0 and in the identified symbol and subcarrier(s).

The CSI-RS 712 is something the CRS 710 in that a cell can be configured with one, two, four or eight CSI-RS (transmitted on one, two, four or eight antenna ports, respectively) and use a particular set of resource elements. In the illustrated embodiment, the CSI-RS may not take all of the subcarriers in the illustrated resource block. The CSI-RS can convey information to the UE based on the number of CSI-RS, the subframe, slot, subcarrier(s), port(s), and so forth used to transmit the CSI-RS. In the representative example of FIG. 7, the CSI-RS is transmitted on a single antenna port in the illustrated symbol and subcarrier(s).

Figure 8:
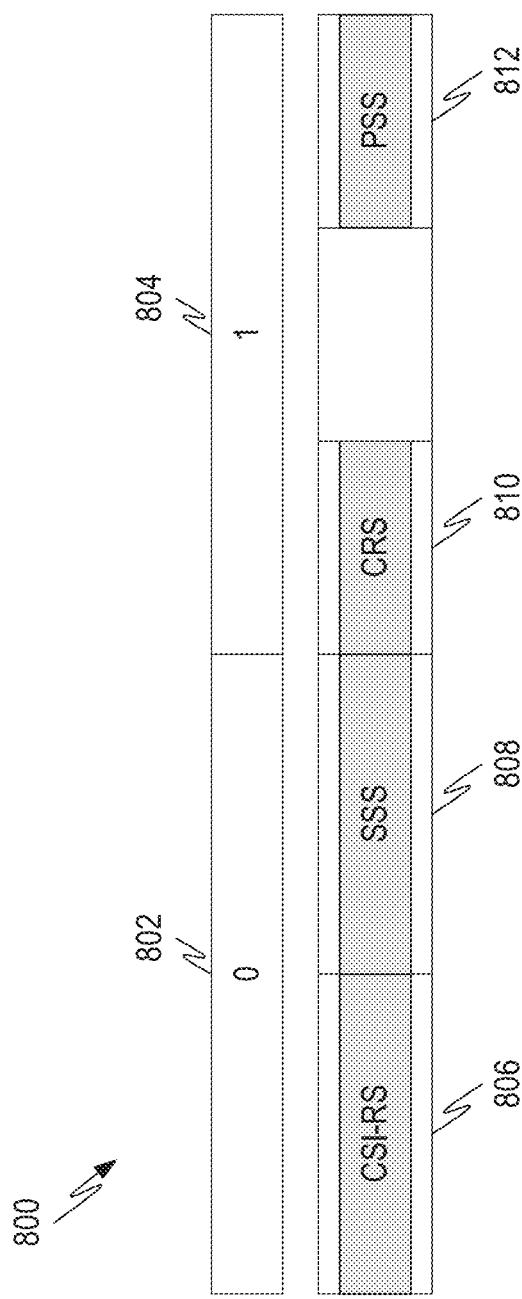
FIG. 8 illustrates another example of a representative DS in accordance with some embodiments.

FIG. 8 illustrates another example of a representative DS in accordance with some embodiments. This FIG can illustrate, for example, where TDD is used (i.e., Type 2 frame structure). The illustrated example shows how a rule that uses two or more subframes for a Type 2 frame structure might look in some embodiments. The illustrated example 800 has two subframes 802 and 804. If the rules for a Type 2 frame structure are:

1. The CRS is transmitted on antenna port 0 in the DwPTS of all special subframes in the DS occasion;
2. The PSS is transmitted in the second subframe of the period for frame structure type 2;
3. The SSS is transmitted in the first subframe of the DS occasion; and
4. A non-zero-power CSI-RS is transmitted in zero or more subframes in the period.

Then the illustration of FIG. 8 illustrate one way that might happen. The second subframe 804 is a special subframe, so the CRS 810 is transmitted on antenna port 0 during the DwPTS (the first "slot" of the special subframe). The PSS 812 is transmitted in the second subframe, so is transmitted in the UpPTS "slot" of the special subframe. This leaves the CSI-RS 806 and the SSS 808 to be transmitted in the first subframe, each in within a slot.

While the various signals are illustrated as being transmitted in a slot within a subframe, they may or may not fill the entire slot and, with the exception of the CRS 810, could be assigned to any slot within the subframe. Other embodiments may use a different number of subframes and may organize the transmission of the various signals in a different manner.

Figure 9:
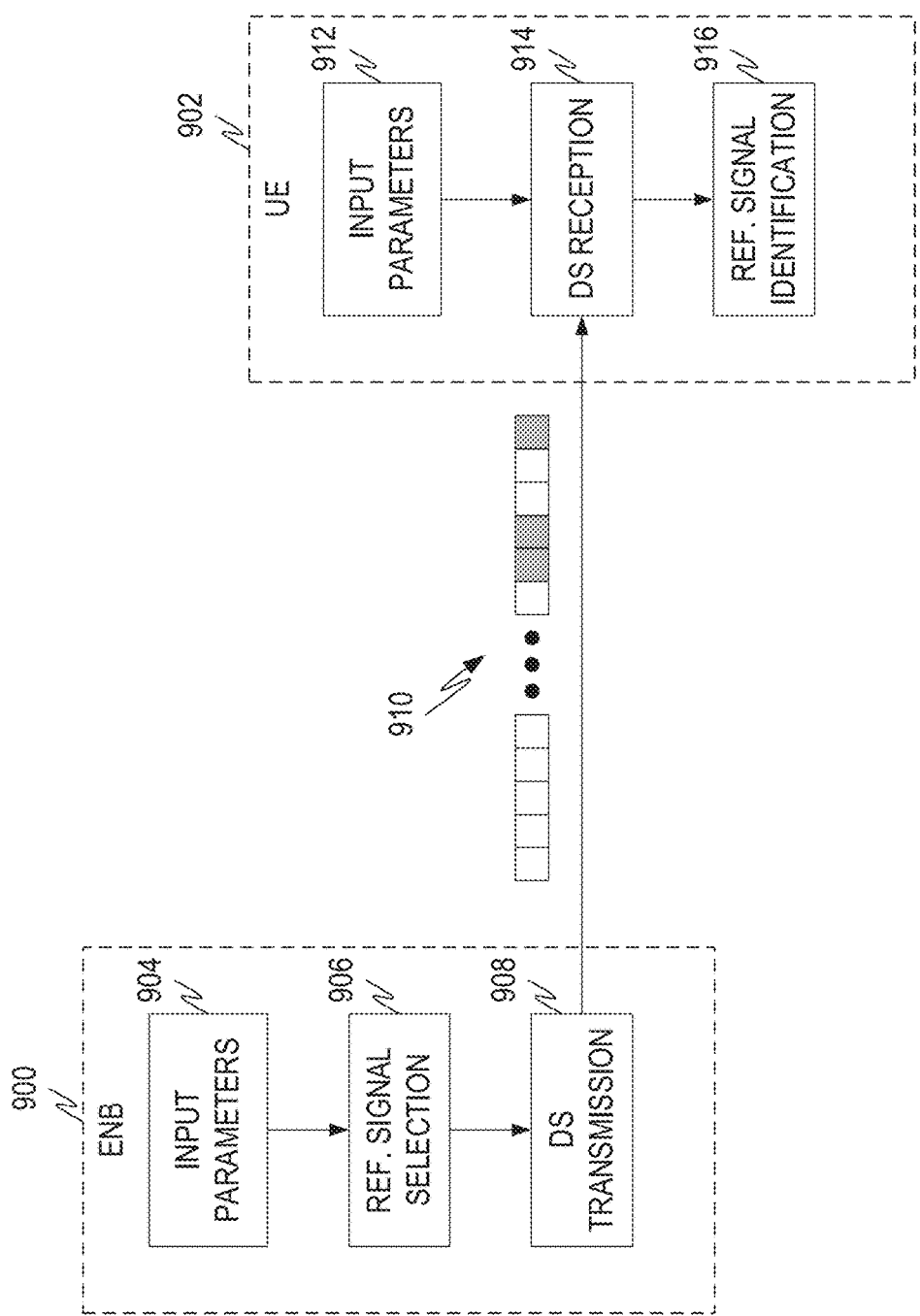
FIG. 9 illustrates an example eNB transmitting an example DS and an example UE receiving the example DS in accordance with some embodiments.

FIG. 9 illustrates an example eNB 900 transmitting an example DS 910 and an example UE 902 receiving the example DS 910 in accordance with some embodiments. As indicated above, the eNB 900 identifies the input parameters needed to create the desired DS in operation 904. Such input parameters may include the frame type (i.e., Type 1, Type 2), the cell identifier to be encoded, and so forth.

In operation 906, the eNB selects the reference signals that makes up the DS and creates the DS to be transmitted in accordance with the input parameters and the DS selection logic rules, such as how many subframes in the DS occasion, which signals are selected to comprise the DS, the subframes to transmit the DS, the parameters of the signals to be transmitted, and so forth to allow a recipient UE 902 to identify the existence of eNB 900 and/or decode the cell ID eNB 900. Example rules for the duration of a DS occasion, to select the signals to comprise a DS and so forth can vary from embodiment to embodiment. In one representative example, a discovery signal occasion for a cell consists of a period with a duration of:

A. one to five consecutive subframes for frame structure Type 1
B. two to five consecutive subframes for frame structure Type 2 where the UE may assume presence of a discovery signal consisting of:

1. cell-specific reference signals on antenna port 0 in all downlink subframes and in DwPTS of all special subframes in the occasion,
2. primary synchronization signal in the first subframe of the occasion for frame structure type 1 or the second subframe of the period for frame structure type 2,
3. secondary synchronization signal in the first subframe of the occasion, and
4. non-zero-power CSI reference signals in zero or more subframes in the occasion.

A discovery signal occasion can occur once every 40, 80 or 160 ms, although the scope of the embodiments is not limited in this respect. For the purpose of discovery-signal-based measurements, a UE will not assume any other signals or physical channels than the discovery signal being present. A UE configured with discovery-signal-based measurements for a deactivated secondary cell shall, except for discovery-signal transmissions, not assume transmission of PSS, SSS, PBCH, CRS, PCFICH, and CSI-RS from that secondary cell until the subframe where the activation command is received.

The eNB 900 then transmits the DS 910 during the DS occasion as indicated by operation 908.

A UE 902 also identifies the start of a DS occasion, and using the input parameters (operation 912) receives the DS 910 as indicated by operation 914. In operation 916, the UE 902 identifies the signals and characteristics that make up the DS 910. Once these are identified, the UE 902 can identify the existence of the eNB 900 and decode the cell ID of eNB 900.

Figure 10:
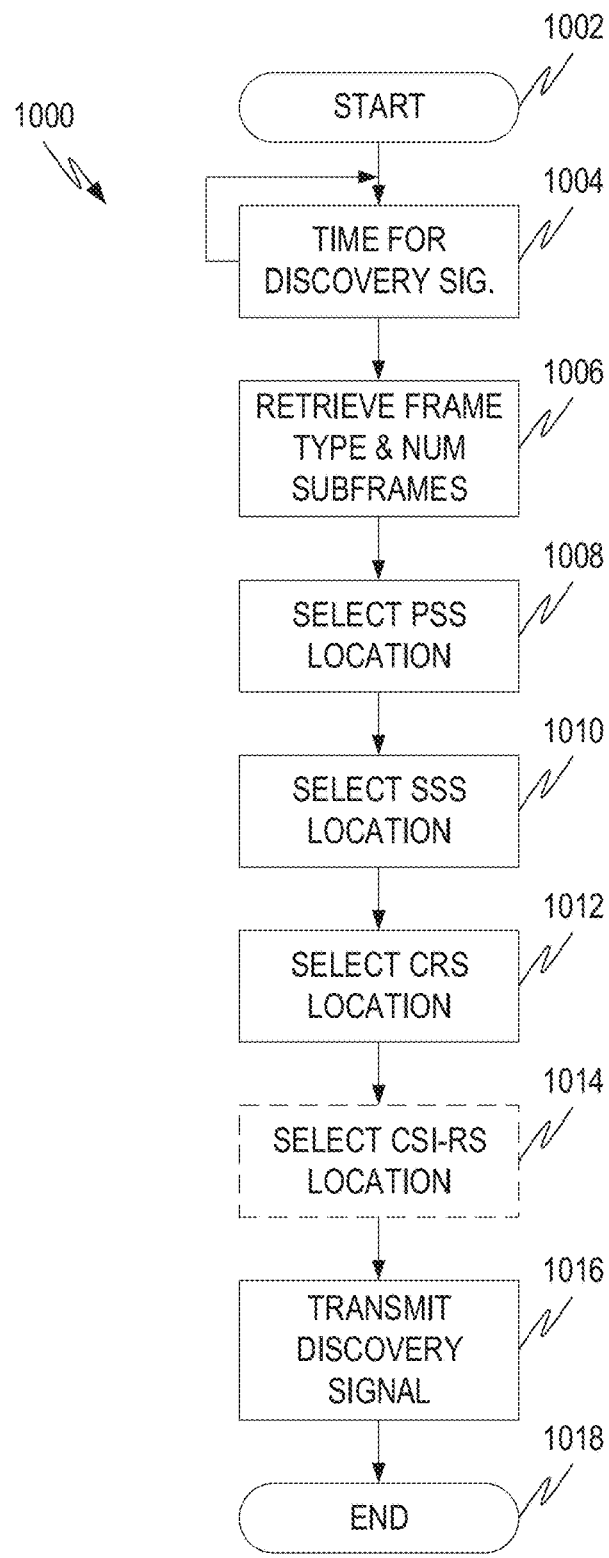
FIG. 10 illustrates an example flow diagram of an eNB creating and transmitting a representative DS in accordance with some embodiments.

FIG. 10 illustrates an example flow diagram 1000 of an eNB creating and transmitting a representative DS in accordance with some embodiments. It is an example of more detailed explanation of the actions of an eNB, such as that illustrated in FIG. 9. The method begins at operation 1002 and in operation 1004 the eNB waits for a DS occasion. In some embodiments, some or all of the operations in FIG. 10 may be performed prior to the occurrence of a DS occasion and the created DS signal transmitted at the DS occasion. In other words, some operations may be performed prior to the DS occasion so that everything or almost everything is ready when the DS occasion arrives.

In operation 1006, the eNB retrieves the frame type and the number of subframes to be used in the DS. Assuming the DS will comprise a PSS, a SSS, and a CRS (at a minimum), operations 1008, 1010 and 1012 select the appropriate parameters for the PSS, SSS and CRS, respectively, including the subframe to be used, along with the slot, symbol, code, and any other appropriate parameters and signal characteristics that will be used for the DS.

In operation 1014, the parameters and characteristics for the CSI-RS are selected, if one or more CSI-RS is to be used.

In operation 1016, the DS is transmitted according to the parameters, characteristics, and so forth selected in the operations above. The method then ends at operation 1018 until the next DS occasion occurs.

Figure 11:
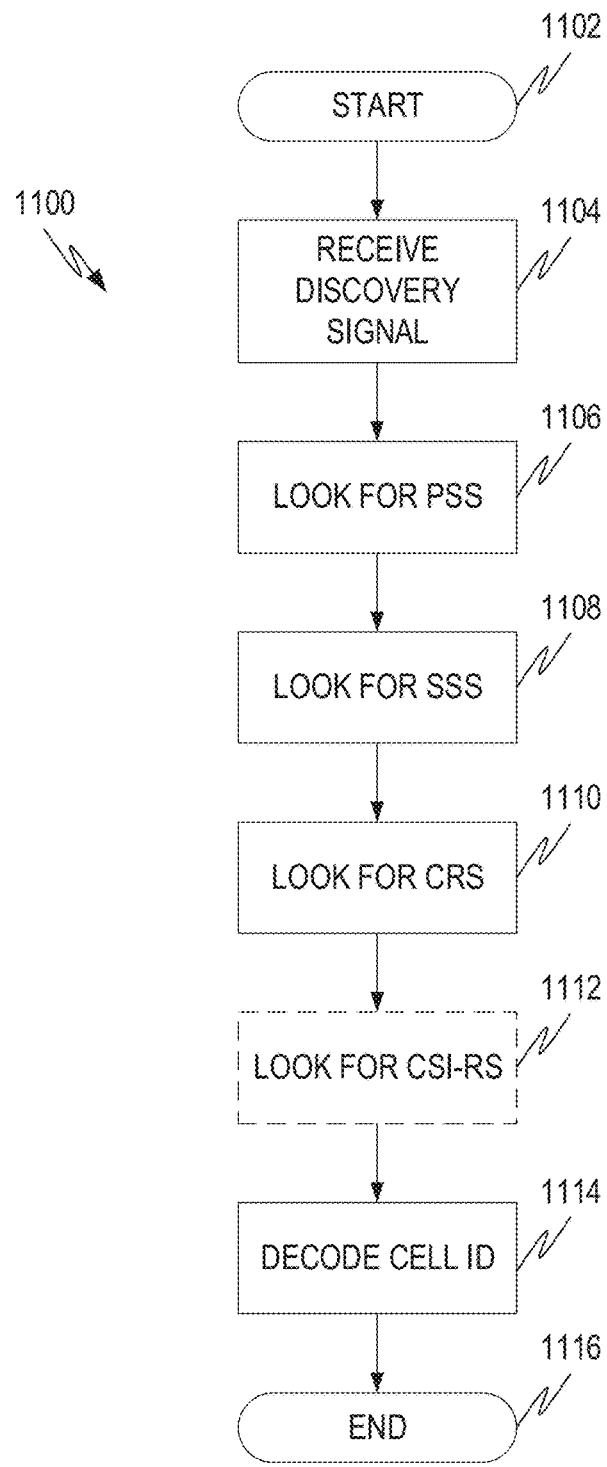
FIG. 11 illustrates an example flow diagram of a UE receiving and decoding a representative DS in accordance with some embodiments.

FIG. 11 illustrates an example flow diagram 1100 of a UE receiving and decoding a representative DS in accordance with some embodiments. The method begins at operation 1102 and the DS is received at operation 1104. The UE then begins the process to understand which signals have been transmitted as part of the DS and to identify the characteristics of the signals. In some embodiments, identifying a specific signal and/or characteristic of the signal may be part of the signal reception process. In other embodiments, the identifying of a specific signal and/or characteristics of the signal are performed after reception of the signal. In still other embodiments, identifying some signals and/or characteristics are part of the reception process and others are performed after reception.

Operations 1106, 1108, 1110, and 1112 identify the existence of the PSS, SSS, CRS and CSI-RS, if they exist in the DS, along with the salient characteristics of each, as appropriate. Since different DS can comprise different signal components and have different characteristics of the signal components, the UE receiver identifies both the existence, and if appropriate, the salient characteristics.

Once the UE has identified which signals have been received as part of the DS and the salient characteristics of the received signals if appropriate, the UE can then decode the cell ID as indicated in operation 1114.

The method ends in operation 1116 until the next DS occasion.

Figure 12:
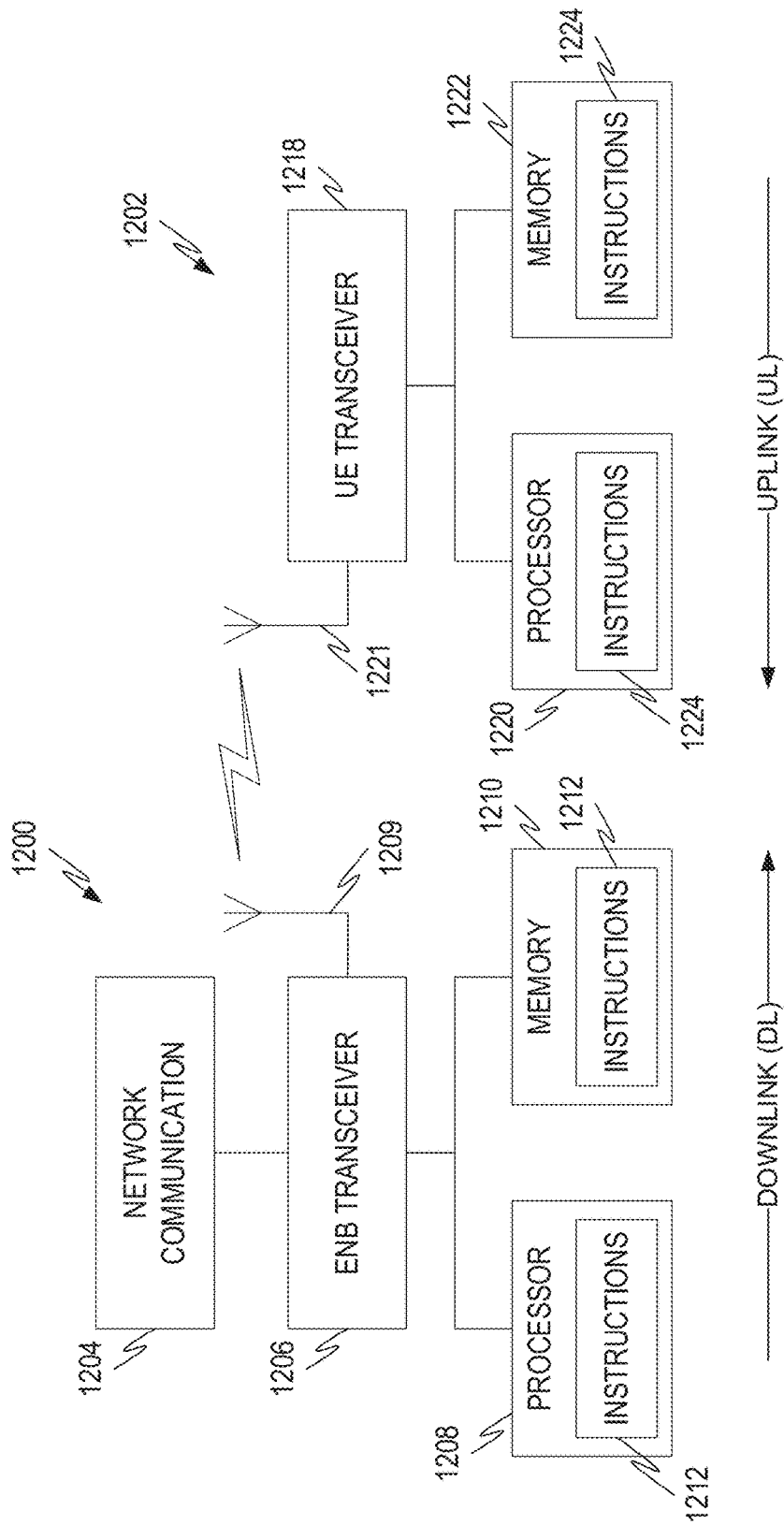
FIG. 12 illustrates a system block diagram of an example system according to some embodiments in accordance with some embodiments.

FIG. 12 illustrates a system block diagram of an example system in accordance with some embodiments. FIG. 12 illustrates a block diagram of various devices, such as a representative eNB 1200 and a representative UE 1202. Such devices could be, for example, the eNBs and UEs described in FIGS. 1-11. Both devices are similar in structure other than the eNB 1200 comprises a connection to the core network such as network communication 1204.

Device 1200 may include processor 1208, memory 1210, transceiver 1206, one or more antennas 1209, instructions 1212 and possibly other components (not shown). Device 1202 may include processor 1220, memory 1222, transceiver 1218, one or more antennas 1221, instructions 1224 and possibly other components (not shown).

Processors 1208 and 1220 comprise one or more central processing units (CPUs), graphics processing units (GPUs), advanced processing units (APUs), or various combinations thereof. The processors 1208 and 1220 provide processing and control functionalities for device 1200 and 1202, respectively. Memory 1210 and 1222 each comprise one or more memory units configured to store instructions 1212 and 1224 and data for devices 1200 and 1202, respectively. The methodologies disclosed herein, such as the flow diagrams of FIGS. 10 and 11 and other functionality described herein can be implemented in software to temporarily or permanently program the processors 1208 and 1220 and other components of devices 1200 and/or 1202 to operate in conjunction with the disclosure.

Transceivers 1206 and 1218 comprises one or more transceivers including, for an appropriate eNB or UE (respectively), circuitry to support a multiple-input and multiple-output (MIMO) antenna 1209, 1221, to support MIMO communications. For device 1200, transceiver 1206 receives transmissions and transmits transmissions, while for device 1202 transceiver 1218 performs similar functions. Transceivers 1206 and 1218 include a receiver, as appropriate for an eNB or UE depending on the implementation. Transceiver 1206 is coupled to antennas 1209 and transceiver 1218 is coupled to antennas 1221, which represent an antenna or multiple antennas, as appropriate to the respective devices.

The instructions 1212, 1224 comprise one or more sets of instructions or software executed on a computing device (or machine) to cause such computing device (or machine) to perform any of the methodologies discussed herein, such as the operations described in conjunction with the eNBs, UE, the flow diagrams above, and so forth. The instructions 1212, 1224 (also referred to as computer- or machine-executable instructions) may reside, completely or at least partially, within processor 1208, 1220 and/or the memory 1210, 1222 during execution thereof by device 1200 and 1202, respectively. The processor 1208, 1220 and memory 1210, 1222 also examples of machine-readable storage media. The various combinations of processor, memory, instructions, transceiver circuitry and so forth are representative examples of hardware processing circuitry.

In FIG. 12, processing and control functionalities are illustrated as being provided by processor 1208, 1220 along with associated instructions 1212, 1224, respectively. However, these are only examples of processing circuitry that comprise programmable logic or circuitry (e.g., as encompassed within a general-purpose processor or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement a processing circuitry mechanically, in dedicated and permanently configured circuitry, or in temporarily configured circuitry (e.g., configured by software) may be driven by, for example, cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The term "computer readable medium," "machine-readable medium" and the like should be taken to include a single medium or multiple media (e.g., a centralized or distributed database, and/or associated caches and servers) that store the one or more sets of instructions. The terms shall also be taken to include any medium that is capable of storing, encoding or carrying a set of instructions for execution by the machine and that cause the machine to perform any one or more of the methodologies of the present disclosure. The term "computer readable medium," and "machine-readable medium" shall accordingly be taken to include both "computer storage medium," "machine storage medium" and the like (tangible sources including, solid-state memories, optical and magnetic media, or other tangible devices and carriers but excluding signals per se, carrier waves and other intangible sources) and "computer communication medium," "machine communication medium" and the like (intangible sources including, signals per se, carrier wave signals and the like).

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The following represent various example embodiments.

Example 1

An Enhanced Node B (eNB) comprising hardware processing circuitry configured to at least: identify the start of a discovery signal (DS) occasion, the DS occasion comprising a sequence of subframes; select a DS to be transmitted within the DS occasion, the DS comprising: a cell-specific reference signal (CRS); a primary synchronization signal (PSS); and a secondary synchronization signal (SSS); and transmit the DS during the DS occasion, the DS identifying the eNB to a UE that receives the DS.

Example 2

The eNB of example 1, wherein the sequence of subframes comprises one to five subframes for a frame structure of type 1.

Example 3

The eNB of example 1, wherein the sequence of subframes comprises two to five subframes for a frame structure of type 2.

Example 4

The eNB of examples 1, 2 or 3 wherein the DS comprises: the CRS on a designated antenna port in a CRS subframe of the sequence of subframes; the PSS transmitted in a PSS subframe of the sequence of subframes, the PSS subframe selected based on a frame structure type; and the SSS transmitted in a SSS subframe of the sequence of subframes.

Example 6

The eNB of example 4, wherein the PSS subframe and the SSS subframe are a first subframe in the sequence of subframes.

Example 7

The eNB of example 4, wherein the PSS subframe is a second subframe in the sequence of subframes and the SSS subframe is a first subframe in the sequence of subframes.

Example 8

The eNB of example 4, wherein the CRS subframe is a downlink subframe or a subframe containing a Downlink Pilot Time Slot (DwPTS).

Example 9

The eNB of example 1 wherein the DS comprises: the PSS transmitted in a first subframe of the sequence of subframes, for a frame structure of type 1 or a second subframe of the sequence of subframes, for a frame structure of type 2; the SSS transmitted in the first subframe of the sequence of subframes; the CRS transmitted on antenna port 0 in all downlink subframes in the sequence of subframes and in a Downlink Pilot Time Slot (DwPTS) of special subframes in the sequence of subframes.

Example 10

The eNB of example 9, wherein the DS further comprises a CSI-RS transmitted in at least one of the sequence of subframes.

Example 11

The eNB of examples 1, 2, or 3 wherein the DS occasion occurs on a periodic basis.

Example 12

The eNB of examples 1, 2, or 3 wherein the DS occasion occurs every 40 ms. or 80 ms. or 160 ms.

Example 13

A device comprising: at least one antenna; transceiver circuitry coupled to the at least one antenna; memory; a processor coupled to the memory and transceiver circuitry; and instructions, stored in the memory, which when executed cause the processor to perform operations comprising: determine a frame structure type; determine a duration for a discovery signal (DS) occasion, wherein the duration is one to five subframes for frame structure type 1 and wherein the duration is two to five subframes for frame structure type 2; identify the start of the DS occasion; select a DS to be transmitted within the DS occasion, the DS comprising: a primary synchronization signal (PSS) transmitted in subframe one for frame structure type 1 or subframe two for frame structure type 2; a secondary synchronization signal (SSS) transmitted in subframe one; a cell-specific reference signal (CRS) transmitted in all downlink subframes of the DS occasion or in Downlink Pilot Time Slots (DwPTS) of special subframes in the DS occasion; and a channel state information reference signal (CSI-RS) transmitted in zero or more subframes in the DS occasion, and transmit the DS during the DS occasion during the designated subframes.

Example 14

An method executed by an Enhanced Node B (eNB) comprising: identifying the start of a discovery signal (DS)

occasion, the DS occasion comprising a sequence of subframes; selecting a DS to be transmitted within the DS occasion, the DS comprising: a cell-specific reference signal (CRS); a primary synchronization signal (PSS); and a secondary synchronization signal (SSS); and transmitting the DS during the DS occasion, the DS identifying the eNB to a UE that receives the DS.

Example 15

The method of example 14, wherein the sequence of subframes comprises one to five subframes for a frame structure of type 1.

Example 16

The method of example 14, wherein the sequence of subframes comprises two to five subframes for a frame structure of type 2.

Example 17

The method of examples 14, 15 or 16 wherein the DS comprises: the CRS on a designated antenna port in a CRS subframe of the sequence of subframes; the PSS transmitted in a PSS subframe of the sequence of subframes, the PSS subframe selected based on a frame structure type; and the SSS transmitted in a SSS subframe of the sequence of subframes.

Example 18

The method of example 17, wherein the PSS subframe and the SSS subframe are a first subframe in the sequence of subframes.

Example 19

The method of example 17, wherein the PSS subframe is a second subframe in the sequence of subframes and the SSS subframe is a first subframe in the sequence of subframes.

Example 20

The method of example 17, wherein the CRS subframe is a downlink subframe or a subframe containing a Downlink Pilot Time Slot (DwPTS).

Example 21

The method of example 14 wherein the DS comprises: the PSS transmitted in a first subframe of the sequence of subframes, for a frame structure of type 1 or a second subframe of the sequence of subframes, for a frame structure of type 2; the SSS transmitted in the first subframe of the sequence of subframes; the CRS transmitted on antenna port 0 in all downlink subframes in the sequence of subframes and in a Downlink Pilot Time Slot (DwPTS) of special subframes in the sequence of subframes.

Example 22

The method of example 21, wherein the DS further comprises a CSI-RS transmitted in at least one of the sequence of subframes.

Example 23

The method of examples 14, 15, or 16 wherein the DS occasion occurs on a periodic basis.

Example 24

The method of examples 14, 15, or 16 wherein the DS occasion occurs every 40 ms. or 80 ms. or 160 ms.

Example 25

A computer readable medium comprising instructions that, when executed by, hardware processing circuitry configured the hardware circuitry to at least: identify the start of a discovery signal (DS) occasion, the DS occasion comprising a sequence of subframes; select a DS to be transmitted within the DS occasion, the DS comprising: a cell-specific reference signal (CRS); a primary synchronization signal (PSS); and a secondary synchronization signal (SSS); and transmit the DS during the DS occasion, the DS identifying the eNB to a UE that receives the DS.

Example 26

The computer readable medium of example 25, wherein the sequence of subframes comprises one to five subframes for a frame structure of type 1.

Example 27

The computer readable medium of example 25, wherein the sequence of subframes comprises two to five subframes for a frame structure of type 2.

Example 28

The computer readable medium of examples 25, 26 or 27 wherein the DS comprises: the CRS on a designated antenna port in a CRS subframe of the sequence of subframes; the PSS transmitted in a PSS subframe of the sequence of subframes, the PSS subframe selected based on a frame structure type; and the SSS transmitted in a SSS subframe of the sequence of subframes.

Example 29

The computer readable medium of example 28, wherein the PSS subframe and the SSS subframe are a first subframe in the sequence of subframes.

Example 30

The computer readable medium of example 28, wherein the PSS subframe is a second subframe in the sequence of subframes and the SSS subframe is a first subframe in the sequence of subframes.

Example 31

The computer readable medium of example 28, wherein the CRS subframe is a downlink subframe or a subframe containing a Downlink Pilot Time Slot (DwPTS).

Example 32

The computer readable medium of example 25 wherein the DS comprises: the PSS transmitted in a first subframe of the sequence of subframes, for a frame structure of type 1 or a second subframe of the sequence of subframes, for a frame structure of type 2; the SSS transmitted in the first subframe of the sequence of subframes; the CRS transmitted on antenna port 0 in all downlink subframes in the sequence of subframes and in a Downlink Pilot Time Slot (DwPTS) of special subframes in the sequence of subframes.

Example 33

The computer readable medium of example 9, wherein the DS further comprises a CSI-RS transmitted in at least one of the sequence of subframes.

Example 34

The computer readable medium of examples 25, 26, or 27 wherein the DS occasion occurs on a periodic basis.

Example 35

The computer readable medium of examples 25, 26, or 27 wherein the DS occasion occurs every 40 ms. or 80 ms. or 160 ms.

Example 36

A User Equipment (UE) comprising hardware processing circuitry configured to at least: identify a start of a DS occasion; receive a DS transmitted during the DS occasion, the DS comprising: a primary synchronization signal (PSS); a secondary synchronization signal (SSS); and a cell-specific reference signal (CRS); and determine an identity of an enhanced Node B (eNB) based on the DS.

Example 37

The UE of example 36 wherein the hardware processing circuitry is further configured to identify a frame structure type and wherein the duration for the DS occasion is based on the frame structure type.

Example 38

The UE of example 37, wherein the duration comprises one to five subframes for a frame structure of type 1.

Example 39

The UE of example 37, wherein the duration comprises two to five subframes for a frame structure of type 2.

Example 40

The UE of examples 36, 37, 38 or 39 wherein the DS comprises: the CRS received on a designated antenna port in a CRS subframe of the sequence of subframes; the PSS received in a PSS subframe of the sequence of subframes, the PSS subframe selected based on a frame structure type; and the SSS received in a SSS subframe of the sequence of subframes.

Example 41

The UE of example 40, wherein the PSS subframe and the SSS subframe are a first subframe in a sequence of subframes.

Example 42

The UE of example 40, wherein the PSS subframe is a second subframe in a sequence of subframes and the SSS subframe is a first subframe in the sequence of subframes.

Example 43

The UE of example 40, wherein the CRS subframe is a downlink subframe or a subframe containing a Downlink Pilot Time Slot (DwPTS).

Example 44

The UE of example 36 wherein the DS comprises: the PSS received in a first subframe of a sequence of subframes, for a frame structure of type 1 or a second subframe of the sequence of subframes, for a frame structure of type 2: the SSS received in the first subframe of the sequence of subframes; the CRS received on antenna port 0 in all downlink subframes in the sequence of subframes and in a Downlink Pilot Time Slot (DwPTS) of special subframes in the sequence of subframes.

Example 45

The UE of example 44, wherein the DS further comprises a CSI-RS received in at least one of the sequence of subframes.

Example 46

The UE of examples 36, 37, 38, 39 or 44 wherein the DS occasion occurs on a periodic basis.

Example 47

The UE of examples 36, 37, 38, 39 or 44 wherein the DS occasion occurs every 40 ms. or 80 ms. or 160 ms.

Example 48

A method performed by User Equipment (UE) comprising: identifying a start of a DS occasion; receiving a DS transmitted during the DS occasion, the DS comprising: a primary synchronization signal (PSS); a secondary synchronization signal (SSS); and a cell-specific reference signal (CRS); and determining an identity of an enhanced Node B (eNB) based on the DS.

Example 49

The method of example 48 further comprising identifying a frame structure type and wherein the duration for the DS occasion is based on the frame structure type.

Example 50

The method of example 49, wherein the duration comprises one to five subframes for a frame structure of type 1.

Example 51

The method of example 49, wherein the duration comprises two to five subframes for a frame structure of type 2.

Example 52

The method of examples 48, 49, 50 or 51 wherein the DS comprises: the CRS received on a designated antenna port in a CRS subframe of the sequence of subframes; the PSS received in a PSS subframe of the sequence of subframes, the PSS subframe selected based on a frame structure type; and the SSS received in a SSS subframe of the sequence of subframes.

Example 53

The method of example 52, wherein the PSS subframe and the SSS subframe are a first subframe in a sequence of subframes.

Example 54

The method of example 52, wherein the PSS subframe is a second subframe in a sequence of subframes and the SSS subframe is a first subframe in the sequence of subframes.

Example 55

The method of example 52, wherein the CRS subframe is a downlink subframe or a subframe containing a Downlink Pilot Time Slot (DwPTS).

Example 56

The method of example 48 wherein the DS comprises: the PSS received in a first subframe of a sequence of subframes, for a frame structure of type 1 or a second subframe of the sequence of subframes, for a frame structure of type 2; the SSS received in the first subframe of the sequence of subframes; the CRS received on antenna port 0 in all downlink subframes in the sequence of subframes and in a Downlink Pilot Time Slot (DwPTS) of special subframes in the sequence of subframes.

Example 57

The method of example 44, wherein the DS further comprises a CSI-RS received in at least one of the sequence of subframes.

Example 58

The method of examples 48, 49, 50, 51 or 56 wherein the DS occasion occurs on a periodic basis.

Example 59

The method of examples 48, 49, 50, 51 or 56 wherein the DS occasion occurs every 40 ms. or 80 ms. or 160 ms.

Example 60

A computer readable medium comprising executable instructions that when executed by hardware processing circuitry configure the hardware processing circuitry to at least: identify a start of a DS occasion; receive a DS transmitted during the DS occasion, the DS comprising: a primary synchronization signal (PSS); a secondary synchronization signal (SSS); and a cell-specific reference signal (CRS); and determine an identity of an enhanced Node B (eNB) based on the DS.

Example 61

The computer readable medium of example 60 wherein the executable instructions further configure the hardware processing to identify a frame structure type and wherein the duration for the DS occasion is based on the frame structure type.

Example 62

The computer readable medium of example 61, wherein the duration comprises one to five subframes for a frame structure of type 1.

Example 63

The computer readable medium of example 61, wherein the duration comprises two to five subframes for a frame structure of type 2.

Example 64

The computer readable medium of examples 60, 61, 62 or 63 wherein the DS comprises: the CRS received on a designated antenna port in a CRS subframe of the sequence of subframes; the PSS received in a PSS subframe of the sequence of subframes, the PSS subframe selected based on a frame structure type; and the SSS received in a SSS subframe of the sequence of subframes.

Example 65

The computer readable medium of example 64, wherein the PSS subframe and the SSS subframe are a first subframe in a sequence of subframes.

Example 66

The computer readable medium of example 64, wherein the PSS subframe is a second subframe in a sequence of subframes and the SSS subframe is a first subframe in the sequence of subframes.

Example 67

The computer readable medium of example 64, wherein the CRS subframe is a downlink subframe or a subframe containing a Downlink Pilot Time Slot (DwPTS).

Example 68

The computer readable medium of example 60 wherein the DS comprises: the PSS received in a first subframe of a sequence of subframes, for a frame structure of type 1 or a second subframe of the sequence of subframes, for a frame structure of type 2; the SSS received in the first subframe of the sequence of subframes; the CRS received on antenna port 0 in all downlink subframes in the sequence of subframes and in a Downlink Pilot Time Slot (DwPTS) of special subframes in the sequence of subframes.

Example 69

The computer readable medium of example 68, wherein the DS further comprises a CSI-RS received in at least one of the sequence of subframes.

Example 70

The computer readable medium of examples 60, 61, 62, 63 or 68 wherein the DS occasion occurs on a periodic basis.

Example 71

The computer readable medium of examples 60, 61, 62, 63 or 68 wherein the DS occasion occurs every 40 ms. or 80 ms. or 160 ms.

What is claimed is:

1. A method comprising:
 decoding a message that includes a value indicating a periodicity of one of 40 milliseconds, 80 milliseconds, and 160 milliseconds for discovery signal (DS) occasions;
 decoding a DS received within the DS occasion, the DS comprising:
 a cell-specific reference signal (CRS);
 a primary synchronization signal (PSS); and
 only one secondary synchronization signal (SSS), wherein for frame structure type 1, the PSS is received in a first subframe of the DS occasion and for frame structure type 2, the PSS is received in a second subframe of the DS occasion.

2. The method of claim 1, further comprising connecting to a small cell based on the DS.

3. The method of claim 1, wherein the DS occasion comprises a period having a duration of:
 one to five consecutive subframes for frame structure type 1, and
 two to five consecutive subframes for frame structure type 2.

4. The method of claim 3, wherein the DS comprises the CRS on antenna port 0 in a downlink subframe and in a subframe containing a Downlink Pilot Time Slot (DwPTS) of the DS occasion; and
 wherein the DS further comprises a non-zero-power Channel State Information Reference Signal (CSI-RS) transmitted in zero or more subframes in the period.

5. The method of claim 1, wherein the PSS and the SSS are received within a same subframe of a sequence of subframes and wherein the PSS is received before the SSS within the subframe.

6. The method of claim 1, wherein a location of time domain and/or frequency domain for PSS, SSS and/or CRS is based upon either a cell identifier or virtual cell identifier.

7. A method comprising:
 transmitting a signal that includes a value indicating a periodicity of discovery signal (DS) occasions; and
 transmitting, within the DS occasion:
 a cell-specific reference signal (CRS);
 a primary synchronization signal (PSS); and
 only one secondary synchronization signal (SSS), wherein for frame structure type 1, the PSS is transmitted in a first subframe of the DS occasion and for frame structure type 2, the PSS is transmitted in a second subframe of the DS occasion.

8. The method of claim 7, wherein the periodicity is one of 40 milliseconds, 80 milliseconds, and 160 milliseconds.

9. The method of claim 7, wherein the DS occasion comprises a period having a duration of:
 one to five consecutive subframes for frame structure type 1, and
 two to five consecutive subframes for frame structure type 2.

10. The method of claim 9, wherein the DS comprises the CRS on antenna port 0 in a downlink subframe and in a subframe containing a Downlink Pilot Time Slot (DwPTS) of the DS occasion; and
 wherein the DS further comprises a non-zero-power Channel State Information Reference Signal (CSI-RS) transmitted in zero or more subframes in the period.

11. The method of claim 7 wherein the PSS and the SSS are received within a same subframe of a sequence of subframes and wherein the PSS is received before the SSS within the subframe.

12. A non-transitory computer-readable medium including instructions that, when executed on an evolved Node-B (eNB), cause the eNB to perform operations including:
 transmitting a signal that includes a value indicating a periodicity of discovery signal (DS) occasions; and
 transmitting, within the DS occasion:
 a cell-specific reference signal (CRS);
 a primary synchronization signal (PSS); and
 only one secondary synchronization signal (SSS), wherein for frame structure type 1, the PSS is transmitted in a first subframe of the DS occasion and for frame structure type 2 the PSS is transmitted in a second subframe of the DS occasion.

13. The non-transitory computer-readable medium of claim 12, wherein the periodicity is one of 40 milliseconds, 80 milliseconds, and 160 milliseconds.

14. The non-transitory computer-readable medium of claim 12, wherein the DS occasion comprises a period having a duration of:
 one to five consecutive subframes for frame structure type 1, and
 two to five consecutive subframes for frame structure type 2.

15. The non-transitory computer-readable medium of claim 14, wherein the DS comprises the CRS on antenna port 0 in a downlink subframe and in a subframe containing a Downlink Pilot Time Slot (DwPTS) of the DS occasion; and
 wherein the DS further comprises a non-zero-power Channel State Information Reference Signal (CSI-RS) transmitted in zero or more subframes in the period.

16. The non-transitory computer-readable medium of claim 12 wherein the PSS and the SSS are received within a same subframe of a sequence of subframes and wherein the PSS is received before the SSS within the subframe.

* * * * *